Patented Sept. 14, 1926.

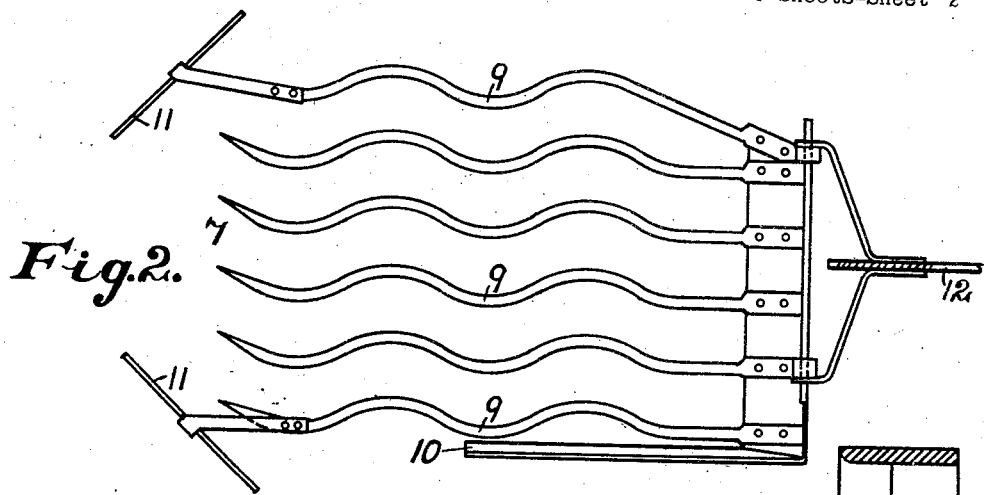
Fig.2.
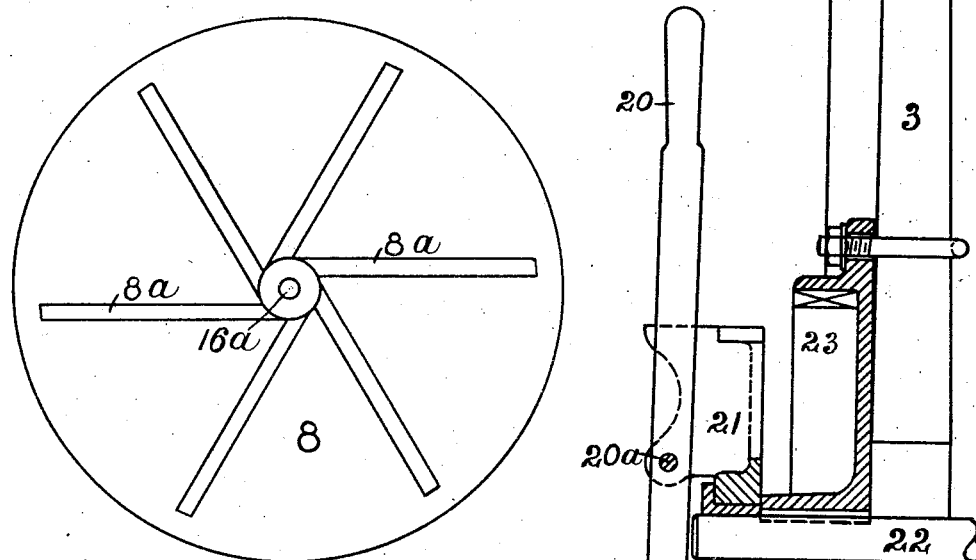
Fig.5.
Fig.3.

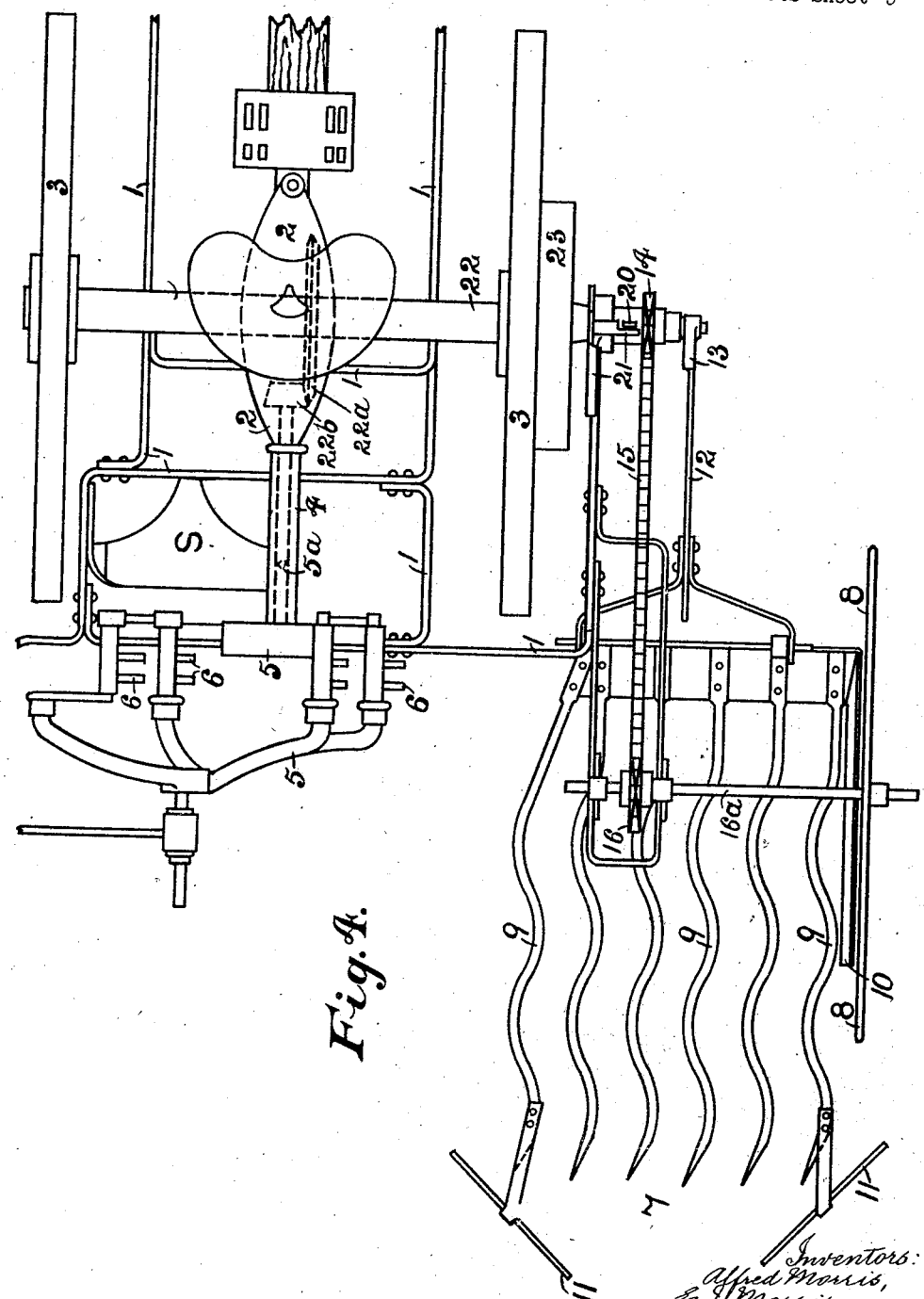

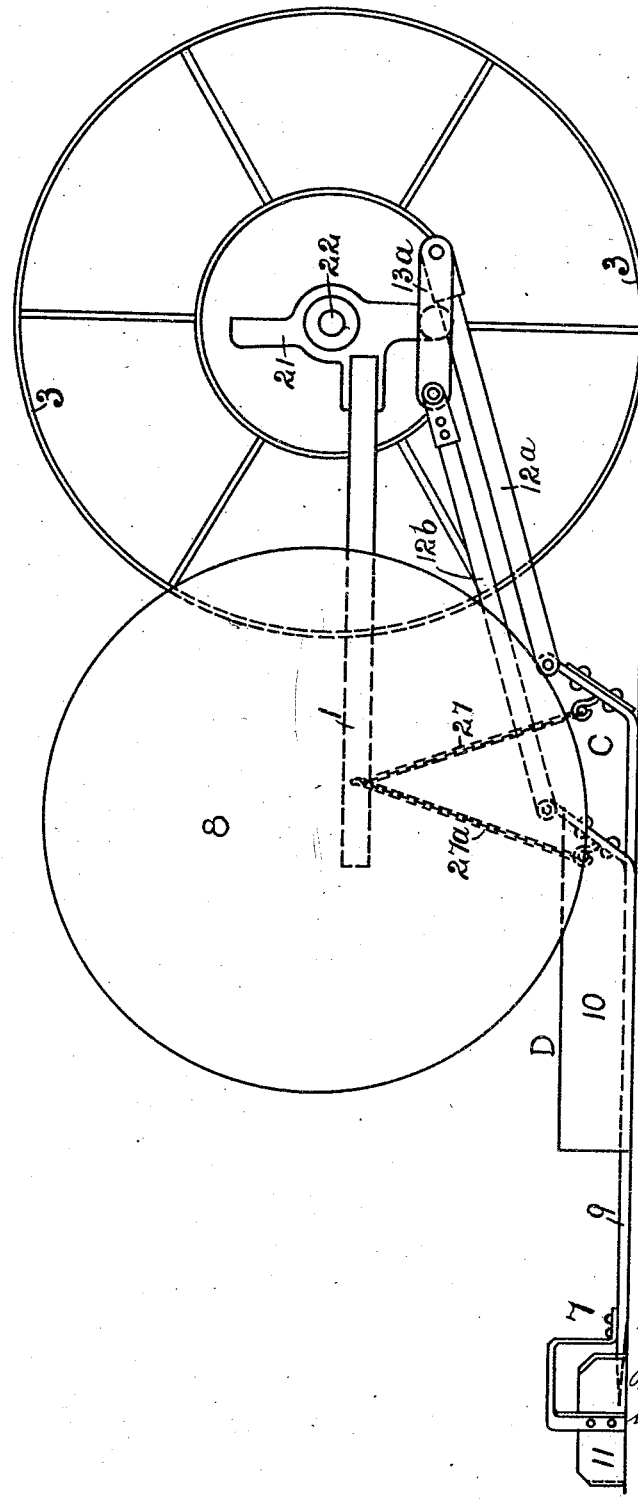

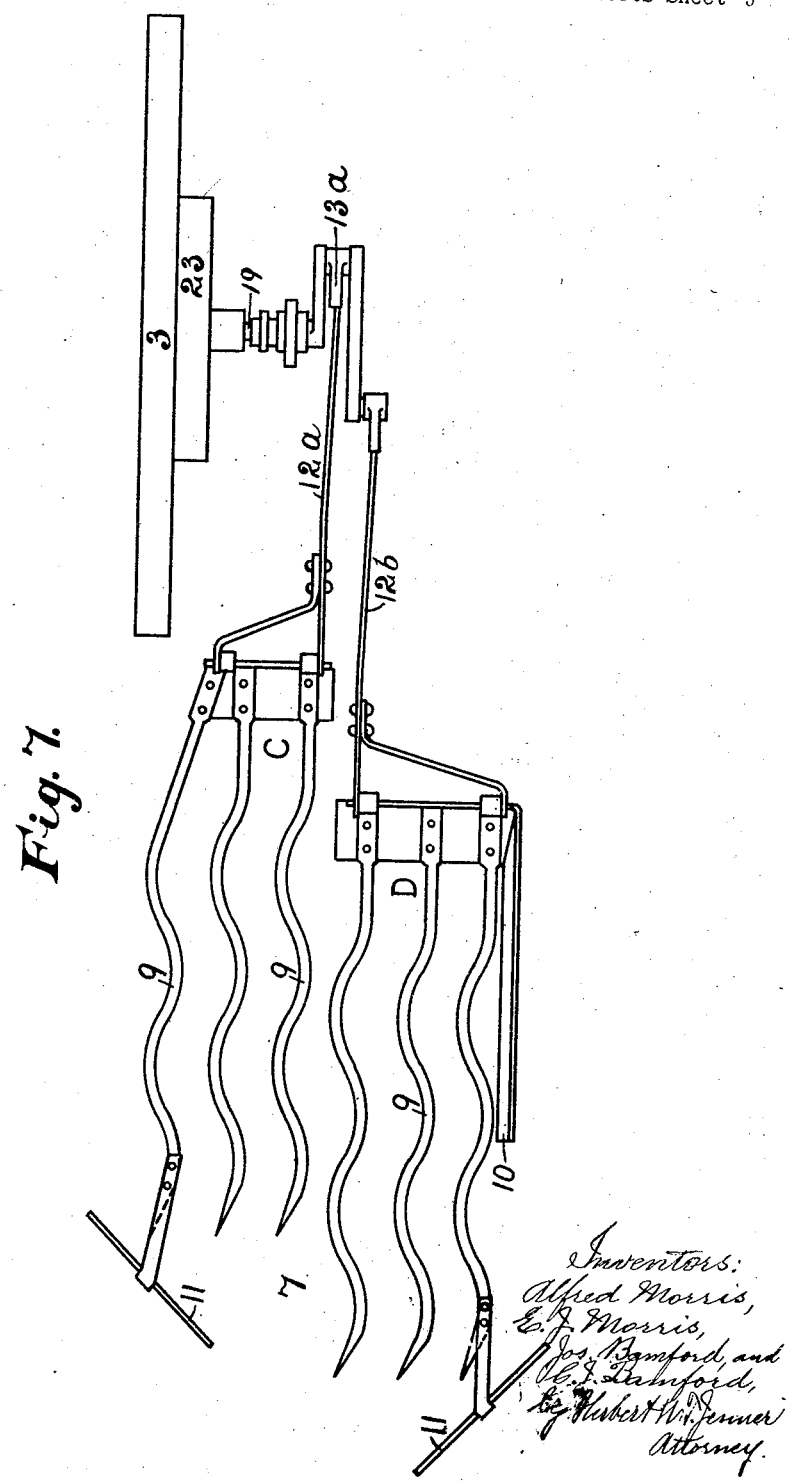

1,600,057

UNITED STATES PATENT OFFICE.

ALFRED MORRIS AND ENOCH JAMES MORRIS, OF ALSAGER, AND JOSEPH BAMFORD AND CYRIL JOSEPH BAMFORD, OF UTTOXETER, ENGLAND.

POTATO-DIGGING MACHINE.

Application filed December 1, 1925, Serial No. 72,570, and in Great Britain September 1, 1924.

This invention relates to machines for digging potatoes. In machines for this purpose as at present constructed it is usual to provide a share or blade which enters the ground and raises the potatoes together with a certain amount of earth, and it is also usual to provide a rotating element having tines or forks which throw or move the potatoes and earth to a delivery point. Difficulty has, however, been experienced in connection with the discharge of the potatoes as no efficient means have yet been found to prevent the potatoes from being scattered over the ground.

As the result of this it has generally been necessary to stop the machine at the end of each row until the potatoes which have just been raised are all picked up. Further, the scattering of the potatoes makes their collection a longer task than is desirable and isolated potatoes are often missed completely or trodden into the earth.

The primary object of the present invention is to provide a machine or an element for application to potato digging machines adapted to cause the delivery of the potatoes in a relatively concentrated and straight row.

The characteristic feature of the present invention is the provision of a reciprocating element comprising forks, rods, chains or equivalent members arranged in trailing relationship to the machine at or near the delivery point, the said reciprocating element or the members thereof being actuated by the movement of the machine.

The reciprocating element or the members thereof are arranged to lie partially or wholly upon or closely adjacent to the surface of the ground and the raised potatoes are delivered at the ends of the members with the result that the members of the reciprocating element reciprocate beneath the potatoes and earth.

If required the reciprocating element may be made in two or more reciprocating portions, and these different portions may be reciprocated from separate cranks or their equivalents so that their movements are out of phase.

Upon the machine adjacent the delivery point we may provide a disc or shield for the purpose of arresting the movement of the potatoes and earth after they have been raised from the ground, and this disc or shield may be mounted so as to rotate or so as to reciprocate with the reciprocating element and it may be made of yielding material or yielding construction so as to avoid bruising the potatoes.

Further, we may combine with the reciprocating element one or more fence plates, forks, or boards arranged in an inclined position relative to the direction of travel of the machine, these fence plates being adapted to displace any potatoes which are inclined to escape from the edges of the reciprocating element so as to ensure that the potatoes will be delivered in a concentrated row at about the centre line of the reciprocating element.

Our invention also comprises suitable driving means for the reciprocating element and for the shield or disc if such be used and it may also comprise means for raising and lowering the reciprocating element as may be required.

*Description of the drawings.*

Fig. 2 is a detail plan view of the potato screen, showing the part 12 in section on the line 2—2 of Fig. 1, Fig. 3 is an enlarged section taken on the line 3—3 in Fig. 1 illustrating a part of the driving gear, Fig. 4 is a plan of Fig. 1, Fig. 5 is an inside elevation of a rotating disc or shield to be herein referred to, Fig. 6 is a view similar to Fig. 1 illustrating a modification of our invention, and Fig. 7 is a plan thereof.

Figure 1:
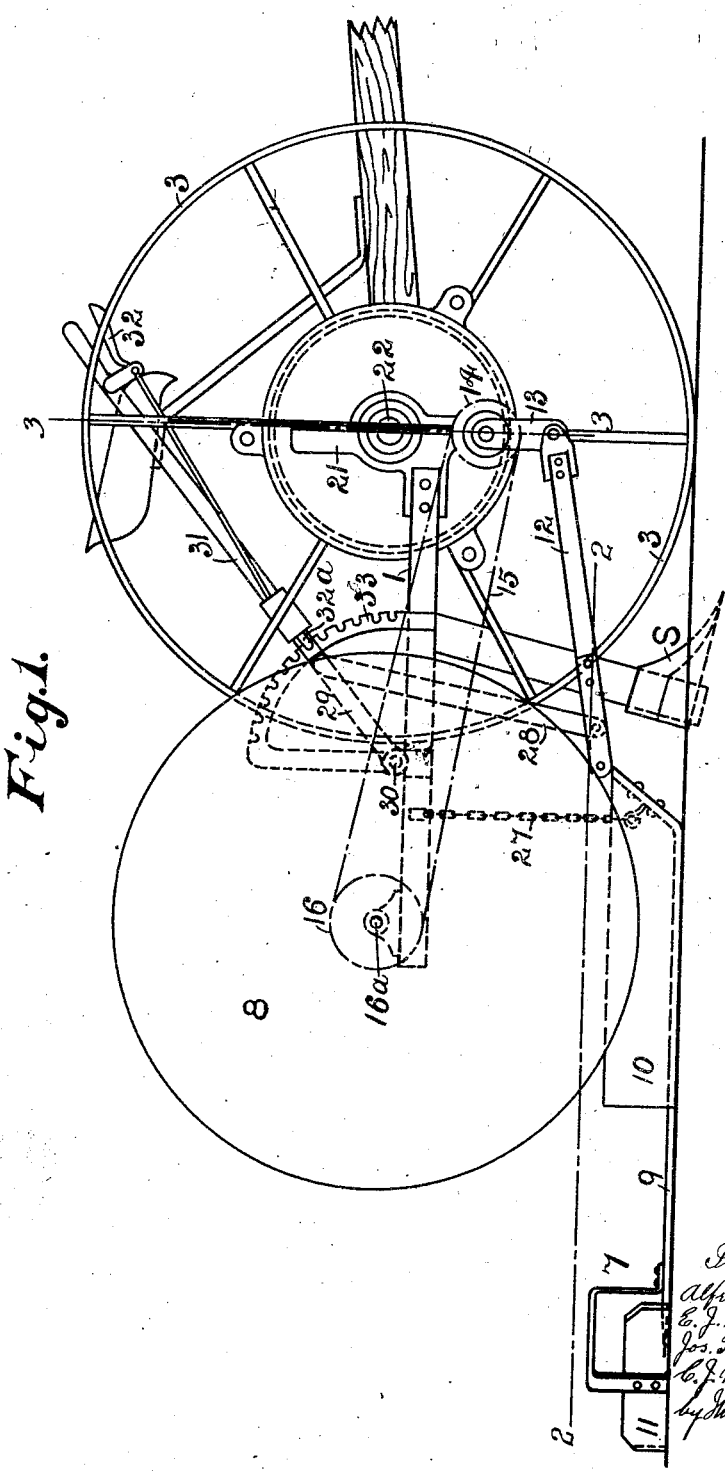
Fig. 1 is a side elevation illustrating a potato digging machine with our invention applied thereto, certain parts having been removed for the sake of clearness.

The machine is provided with a main frame 1 supported by a rotary axle 22 and ground wheels 3. The main frame has a gear casing 2 secured to it, and a shaft bearing 4. A shaft $5^a$ is journaled in the bearing 4, and is revolved from the axle by bevel gears $22^a$ and $22^b$ inclosed in the casing 2. A rotary device 5, hereinafter called a reel, is secured on the shaft $5^a$ and is provided with tines 6. A plow or digging blade S is secured to the frame, and digs up the earth and potatoes as the machine is drawn along, and delivers them to the reel 5, which delivers them sidewise, or transversely of the line of draft of the machine, into a reciprocating element or screen designated as a whole by the numeral 7. The reel or similar device which delivers the earth and potatoes sidewise of the line of draft is of any approved construction for that purpose.

A rotary disc 8 or other moving or stationary shield, preferably of yielding material may be provided to arrest the movement of the potatoes and earth thrown by the rotating element 5.

As will be seen from the drawings, the reciprocating element 7 comprises a number of bars or tines 9 which, in the construction illustrated, are of curved or sinuous form, having portions which are disposed obliquely to the direction of travel of the machine. This reciprocating element 7 is clearly shown at Fig. 2.

It is not essential, however, to use bars or rods of sinuous form as shown on the drawings, as we may use straight bars, chains, or other members having a reciprocating to and fro motion.

At the outer side of the reciprocating element 7 a fence 10 is provided to prevent potatoes from flying between the disc 8 and the earth and at the rear ends of the outer two bars 9 inclined plates, forks, or boards 11 are provided for displacing the potatoes towards the centre line of the reciprocating element so that the potatoes will be delivered in a concentrated row.

The reciprocation of the element 7 is effected by means of a connecting rod 12 mounted on a crank 13 which may be formed on or attached to a sprocket wheel 14 upon which is a chain 15 driving a sprocket wheel 16, the latter being connected to the shaft $16^a$ which operates the rotary disc 8. The shaft $16^a$ is journaled in bearings on the main frame. The sprocket wheel 14 and crank 13 may be provided with an extension 17 formed with clutch teeth 18, (see Fig. 3) and the sprocket wheel 14 and crank 13 are movable along a shaft 19 by means of a forked lever 20. The said shaft is journaled in a bearing on a bracket 21 mounted upon an extension of the axle 22. The hand lever 20 is fulcrumed at $20^a$ on the fixed bracket 21, the lever 20 being moved sideways to disconnect the clutch teeth 18 and free the sprocket wheel 14 of the other gearing. The disengagement of the tooth gearing is necessary when it is desired to put the disc 8 and the reciprocating element 7 out of action as for example, when it is necessary to convey or move the machine from one field to another.

The axle of one of the land wheels 3 is provided with an internally toothed gear wheel 23 which drives a pinion 24 loosely mounted upon the shaft 19 and having a sleeve-like extension 25 and clutch teeth 26 at the end. The arrangement is such that the pinion 24 is driven by the travel of the machine, while the sprocket wheel 14 and crank 13 may be driven by moving the clutch teeth 18 into engagement with the clutch teeth 26 by means of the hand lever 20.

The forward end of the reciprocating element 7 may be supported by a chain or link 27 and a link 28 is provided connected to a crank lever 29 mounted on a shaft 30 upon which a hand lever 31 is provided, the said hand lever 31 having a trigger lever 32 provided with a spring-controlled pawl $32^a$ to engage a tooth quadrant 33. Pressure on the trigger lever 32 disengages the pawl $32^a$ from the teeth of the quadrant 33 and enables the hand lever 31 to be moved to allow the spring-controlled pawl $32^a$ to engage any one of the teeth of the quadrant 33. By this means the forward end of the reciprocating element 7 may be raised or lowered to any required degree.

The rotating element 5 is preferably driven from the axle 22 by a bevel wheel $22^a$ secured thereto and gearing with a small bevel wheel $22^b$ on the shaft $5^a$ of the rotating element 5. Other suitable mechanism may be employed for transmitting the necessary motion to the rotating element 5.

If required the inner surface of the rotating flexible disc 8 may be provided with inwardly projecting ribs $8^a$ which may be arranged tangentially to a small circle concentric with the disc as shown at Fig. 5, or if desired the ribs $8^a$ may be arranged radially. The ribs $8^a$ are preferably of india rubber or other flexible material and are for the purpose of momentarily retarding the travel of the potatoes as they meet the disc 8 and to cause the soil or earth to be dislodged therefrom.

Figs. 6 and 7 illustrate in side elevation and plan respectively a modification of our invention. In this case the reciprocating element 7 is divided into two portions C and D, each portion receiving motion from a two-throw crank $13^a$ by the connecting rods $12^a$ and $12^b$. The said two-throw crank $13^a$ causes the two portions C and D of the element 7 to reciprocate in opposite directions. Each portion of the reciprocating element 7 is supported by a chain or link 27 and $27^a$ and raised and lowered in precisely the same manner as before described with reference to Fig. 1.

It will be understood that any suitable means may be employed for delivering the soil and crop from the share on to the reciprocating element.

What we claim as our invention and desire to secure by Letters Patent is:—

1. In a potato digging machine, the combination, with a travelling frame provided with a plow, and a rotary reel for delivering the earth and potatoes sidewise of the line of draft; of a screen for receiving the earth and potatoes from the reel, and means for reciprocating the screen longitudinally as the machine is drawn along.

2. A potato digging machine as set forth in claim 1, the said screen being provided at its rear end with deflecting devices arranged at an angle to the line of draft and operating to concentrate the potatoes into a row.

3. A potato digging machine as set forth in claim 1, the said screen being provided with sinuous screening bars.

4. A potato digging machine as set forth in claim 1, the said screen being formed in two sections arranged side by side, and the said sections being provided with separate driving mechanisms which reciprocate them simultaneously and in opposite directions.

5. A potato digging machine as set forth in claim 1, and having also a shield arranged at the outer side of the screen and operating to prevent the potatoes from being thrown past the screen by the reel.

6. A potato digging machine as set forth in claim 1, and having also a circular shield journaled in the main frame and arranged at the outer side of the screen, and means for rotating the said shield as the machine is drawn along.

7. A potato digging machine as set forth in claim 1, and having also a circular shield journaled in the main frame and arranged at the outer side of the screen and provided on its inner face with buffer ribs of soft material for the potatoes to strike against, and means for revolving the said shield as the machine is drawn along.

8. A potato digging machine as set forth in claim 1, and having also a circular shield journaled in the main frame and arranged at the outer side of the screen, a fence device supported by the screen and arranged adjacent to the lower part of the said screen to prevent potatoes from being thrown between it and the ground, and means for revolving the said shield as the machine is drawn along.

In testimony whereof we have hereunto set our hands.

ALFRED MORRIS.
ENOCH JAMES MORRIS.
JOSEPH BAMFORD.
CYRIL JOSEPH BAMFORD.